May 29, 1962 G. H. DEWITZ 3,037,185
SONAR APPARATUS AND COMPONENTS
Filed March 2, 1951 7 Sheets-Sheet 1

Inventor
GERHARD H. DEWITZ
By
Curtis Morris Safford.
Attorneys

May 29, 1962 G. H. DEWITZ 3,037,185
SONAR APPARATUS AND COMPONENTS
Filed March 2, 1951 7 Sheets-Sheet 2

Inventor
GERHARD H. DEWITZ
Curtis, Morris & Safford
Attorneys

Inventor
GERHARD H. DEWITZ

Inventor
GERHARD H. DEWITZ
By
Curtis, Morris & Safford
Attorneys

United States Patent Office 3,037,185
Patented May 29, 1962

3,037,185
SONAR APPARATUS AND COMPONENTS
Gerhard H. Dewitz, Westport, Conn., assignor to C.G.S. Laboratories, Inc., Stamford, Conn., a corporation of Connecticut
Filed Mar. 2, 1951, Ser. No. 213,548
16 Claims. (Cl. 340—3)

This invention is described as embodied in a device for detecting and locating underwater objects, such as submarines.

Figures 1, 2, 3:
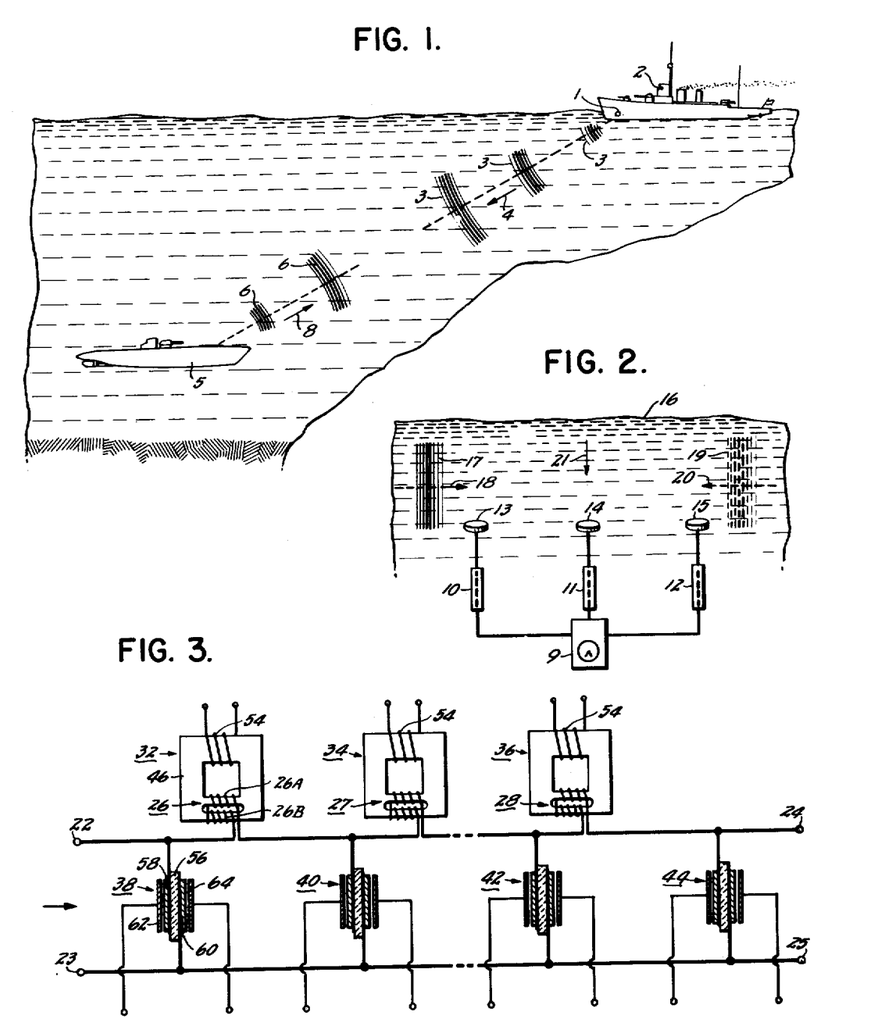
FIGURE 1 is a diagrammatic representation illustrating the operation of a submarine-detecting sonar system.
FIGURE 2 is a simplified diagrammatic representation of certain components of a sonar system.
FIGURE 3 is a diagrammatic circuit of a continuously variable delay line.
Figure 2:
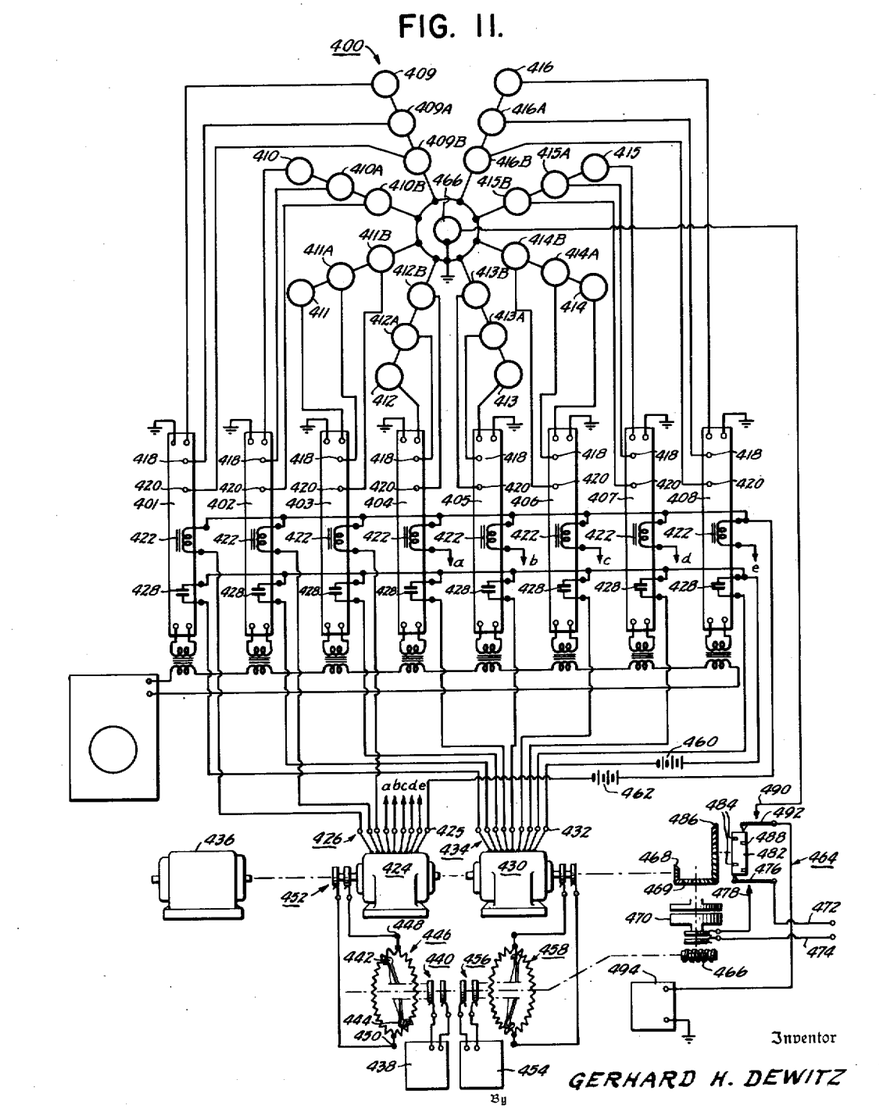

In systems ordinarily used for the detection and location of submarines by surface vessels, referred to as sonar systems, an intense burst or pulse of sound energy is sent out through the water from apparatus mounted upon the hull of the surface vessel below the water line. When this pulse of sound energy strikes the surface of a submarine, or any other sound-reflecting object, it is reflected and travels back through the water to a detecting apparatus also carried by the surface vessel. Thus, as shown in FIGURE 1 of the drawings, a sonar apparatus 1 carried by a surface vessel 2 sends out underwater pulses of sound energy, diagrammatically indicated at 3. These pulses 3 travel in the direction indicated by the arrow 4 and are reflected by the surface of a submarine 5, the reflected pulses, diagrammatically indicated at 6, traveling back through the water in the direction indicated by the arrow 8 toward the surface vessel 2. These reflected pulses are detected by the sonar apparatus 1 and indicate the presence of the submarine 5.

Such systems also reveal the direction and distance from the surface vessel to nearby submarines. For example, the transmitted pulses 3 may be radiated in a beam, similar to a searchlight beam, and the direction of this beam used as an indication of the direction to the submarine. Or the direction from which the received or reflected pulse arrives at the sonar system 1 may be measured to indicate the approximate direction of the submarine. Moreover, knowing the speed of sound transmission in water, it is only necessary to measure the elapsed time between the transmission of a pulse and the reception of the reflected pulse to determine the distance to the submarine.

The presence and position of submarines may be determined by sweeping or scanning this beam of sonic pulses back and forth in various directions through the body of water and thus "search" the entire area. The receiver portion of the sonar apparatus 1, which picks up or receives the reflected pulses of sound energy, also is arranged to have high directional sensitivity, so that it will respond to sound energy arriving from only a given direction. To accomplish this scanning operation, the radiating and receiving elements of the sonar system may be mounted upon the hull of the vessel 2 so that they can be turned mechanically and aimed in various directions.

Such a method of detecting and locating submarines is subject to several disadvantages, among which is the fact that the speed of sound in water is relatively slow, and therefore the receiver must be turned very slowly to allow time for the pulse of sound energy to travel from the transmitter to the submarine and back to the receiver. If the receiver is turned too rapidly, it will be aimed in the wrong direction when the reflected sound pulses return. With such a slow scanning speed, considerable time is required to cover a large area and several separate instruments may be required to search the body of water with the necessary speed. There are other obvious difficulties and disadvantages in mounting and maintaining movable underwater transmitters and receivers.

Another method of accomplishing the scanning operation is to mount only the transmitter for mechanical movement and to utilize several receivers fixed to the side of the hull and aimed in different directions to receive the reflected pulses. With this method the transmitter is scanned in various directions, and the receivers turned on and off in rapid succession so that by comparing the relative strengths of the signals produced by the respective receivers from the reflected pulses, the direction from which the reflected pulses are arriving can be determined. The receiver which has the highest directional sensitivity in the direction of the reflected pulses, produces the strongest signal and thus indicates the presence of a submarine and its approximate direction. In this arrangement, switching from one to another of the receivers causes discontinuities in the scanning reception, and undesirable transient noise signals are introduced into the electrical circuits connected with the receivers. In addition, this system does not give complete or continuous scanning coverage in all directions from the surface vessel, and the accuracy is limited by the number of receivers employed.

In one embodiment of this invention, which will be described presently, a scanning system is provided which does not depend upon mechanically moving parts for controlling the direction of the transmitted beam or the direction of greatest sensitivity of the receiving apparatus, and which permits continuous high speed scanning over any desired area.

In transmitting the sonic pulses, a transducer, or hydrophone as it is ordinarily called, is utilized which converts electrical energy into sonic energy. When such a transducer or hydrophone is energized momentarily by an electrical pulse, it transmits or radiates a corresponding short pulse of sonic energy into the water. This same transducer can be utilized also to convert a sonic pulse impinging upon the transducer into a corresponding pulse of electrical energy which is fed into appropriate amplifying, detecting, and measuring circuits.

In order to transmit a beam of sonic energy and in order to make the receiver sensitive to sonic pulses arriving from substantially only one direction at a time, or in other words, to provide a transmitter and a receiver having high directional sensitivity, a number of such transducers, or hydrophones, are positioned in fixed, spaced relationship to one another. These hydrophones are connected to the receiving or transmitting apparatus by electrical lines which delay the transmission of the electrical energy to and from the hydrophones by an amount depending upon the characteristics of the line.

This can be more readily understood by referring to FIGURE 2 which shows a combined electrical pulse generator and submarine indicating device, diagrammatically indicated at 9, which is connected by three delay lines, shown diagrammatically at 10, 11 and 12, to three stationary hpdrophones 13, 14 and 15 arranged in a straight line and mounted in a body of water 16. Assuming the apparatus to be operating as a receiver and a reflected pulse of sonic energy 17 to be moving through the water 16 in the direction indicated by the arrow 18, it is seen that the pulse will first impinge upon the hydrophone 13, and subsequently upon the hydrophone 14, and still later, upon the hydrophone 15.

As the pulse 17 impinges on each of the hydrophones 13, 14 and 15 in turn, the respective hydrophones will convert some of the sonic energy of the pulse into respective pulses of electrical energy. The pulse of electrical energy from hydrophone 13 passes through the delay line 10 to the indicating device 9; likewise the pulses of energy from hydrophones 14 and 15 pass through delay lines 11 and 12, respectively, to the indicating device 9.

If the delay lines 10, 11 and 12 were adjusted to have equal delay times, that is, so that the pulses of electrical energy were delayed for an equal period of time in passing through each one, then the pulses of electrical energy from the hydrophones 13, 14 and 15 would arrive as three separate pulses of energy at the indicating device 9 at successive intervals of time.

If, however, the delay times of the lines 10, 11 and 12 are adjusted so that line 10 has the longest delay, line 11 has a somewhat shorter delay, and line 12 has a still shorter delay, the pulse of electrical energy from the hydrophone 13 would be retarded by the greatest amount, the pulse from the hydrophone 14 would be delayed by a lesser amount, and the pulse from the hydrophone 15 would be delayed by a still lesser amount. Thus, the delay times of the delay lines can be adjusted so that all of the pulses of electrical energy will arrive simultaneously at the indicating device 9, and, if their energy is combined, a single electrical pulse of maximum strength will be produced.

It is apparent, however, that sonic pulses arriving at the receiver from other directions will not be combined to produce maximum signal strength. However, by constructing the delay lines so that the delay in each line can be varied, the direction of travel of the incoming sonic pulse can be determined from the adjustment of the respective delay times required to produce a combined electrical pulse of the greatest strength.

In the case of a sonic pulse 19 traveling in the direction indicated by arrow 20, the relative lengths of the delay times in delay lines 10, 11 and 12 must be reversed to produce maximum signal strength, that is, delay line 12 will have the greatest delay time and delay line 10, the least delay time.

A sonic pulse arriving from the direction indicated by arrow 21, impinges upon hydrophones 13, 14 and 15 at the same time. In order for the resulting electrical pulses to arrive at the indicating device 9 simultaneously, the delay times of the lines 10, 11 and 12 must be identical. Other adjustments of the relative lengths of the delay times will cause the receiver to be most sensitive to sonic pulses arriving from directions intermediate the directions of the arrows 18 and 21 and intermediate the directions of the arrows 20 and 21.

In order for the system to operate as a transmitter, the device 9 is conditioned to generate an electrical pulse which is simultaneously impressed on the respective delay lines 10, 11 and 12, which control the time at which these electrical pulses arrive at the hydrophones 13, 14 and 15. As the electrical impulses arrive, respectively, at each of the hydrophones 13, 14 and 15, they are converted into sonic pulses which are radiated by the hydrophones 13, 14 and 15 into the body of water 16. These sonic pulses will reinforce each other along one path, depending upon the relative delay times of lines 10, 11 and 12, to form a directional beam of sonic energy, in this example, in the shape of a portion of the surface of a cone.

The sonic apparatus of FIGURE 2 has only a single line of fixed hydrophones 13, 14 and 15 and therefore it is only suitable for determining direction changes in the plane of the drawing. Three-dimensional selectivity can be provided by positioning the hydrophones in a substantially planar array, for example, over an area such as is represented by a triangle, rectangle, or circle. Devices using such arrays will be described below.

Accordingly, an object of this invention is to provide submarine hydrophone-array projectors and receivers incorporating scanning systems including continuously variable delay line networks wherein the direction of maximum sensitivity or directivity of the hydrophone array is altered by changing the characteristics of the delay networks, and to provide delay lines having electrically controllable substantially continuously variable delay times.

Another feature of this invention resides in delay lines wherein the delay time may be readily controlled from a remote location.

Another feature of the invention relates to delay lines wherein the delay time is rapidly variable, thus permitting increased scanning speed.

Another advantage of the invention resides in permitting substantially simultaneous observation of two or more submarines from a substantially co-planar array of transducers.

Other objects relate to improved components and combinations of components having utility in sonar systems as well as in other apparatus, and particularly to improved variable-inductance components.

Other objects, advantages, and features of the present invention will be in part apparent from, and in part pointed out in, the following description considered in conjunction with the accompanying drawings, in which, as explained above.

In the other drawings:

FIGURE 11 is a diagrammatic representation of another sonar system using a series of concentric circular arrays of hydrophones;

A delay line usually comprises a number of lumped inductive elements connected in series with the line and a number of lumped capacitive elements each connected across the line between adjacent inductive elements. FIGURE 3 shows such a delay line. The signal to be delayed is applied between two input terminals at 22 and 23 and travels along the line toward the right to arrive, after a controlled period of time, at the output terminals 24 and 25. The circuit between terminals 22 and 24 includes three serially-connected inductive windings, generally indicated at 26, 27 and 28, of three continuously variable inductors, generally indicated at 32, 34 and 36. The other input terminal 23 is connected directly to the output terminal 25.

Four continuously variable shunt capacitance elements, generally indicated at 38, 40, 42 and 44 are connected across the line between the inductors 32, 34 and 36, as shown. Any desired number of capacitive and inductive elements and various arrangements thereof can be used in the line to provide the desired characteristics, as is well understood by those familiar with this art.

Because the inductors 32, 34 and 36 are of identical construction, only the inductor 32 will be described. This inductor includes a core 46 composed of a ferromagnetic ceramic material, for example such as is described by Snoek in U.S. Patents 2,452,529; 2,452,530; and 2,452,531. Such material, sometimes referred to as ferrite, has a relatively high permeability and a relatively low saturation flux density. These two characteristics make it well suited for use as a magnetic core material, for instance, for use in an inductor as shown. In addition, this material, when used as a magnetic core, exhibits the characteristic that its incremental permeability is decreased markedly when the material is subjected to a strong magnetic field. That is, when a coil is wound on such a ferromagnetic ceramic core, the apparent reactance of the coil to the flow of a low-amplitude alternating current signal is decreased markedly if the core is simultaneously subjected to a relatively strong auxiliary magnetic field. With no D.C. bias field, the material exhibits a certain permeability to the A.C. field. As the bias field is increased from zero, the incremental permeability to the A.C. field decreases rapidly from a maximum to a low value, and as the bias field is further increased, the core material becomes more saturated and the incremental permeability decreases at a reduced rate to a minimum.

In order to provide a D.C. bias magnetic field, the inductor core 46 in FIGURE 3 carries a bias winding 54. The presence of a D.C. current in this winding 54 produces a bias magnetic field throughout the core. This bias field affects the incremental permeability of the core 32 so that the inductive reactance of the winding 26 in the delay line can be controlled by varying the current through the bias winding 54.

In order to minimize the coupling between the control or bias winding 54 and the inductive winding 26, the winding 26 is divided into two equal parts 26A and 26B, which are wound in opposite directions on separate portions of the core so that any currents induced in the windings 26A and 26B by changes in the flux induced in the core 46 by the bias winding 54 will produce opposing voltages so that no signal will be induced into the delay line.

Alternatively, the interaction can be minimized by forming the bias winding 54 of two equal and oppositely wound portions while using a continuously wound coil for winding 26.

In order to establish the bias magnetic field, the control winding 54 is connected to an adjustable voltage source (not shown).

It is apparent that what has been said about inductor 32 applies to the other inductors forming the artificial delay line. With this arrangement, the current through the bias windings 54 of these inductors can be varied simultaneously, thereby, varying the reactance of windings 26, 27 and 28, and accordingly changing the delay characteristics of the line. Although only three inductors 32, 34 and 36 and four capacitors 38, 40, 42 and 44 are shown, it is well known in the art that a delay line may include any desired number and arrangement of inductors and capacitors.

Thus, variation in the exciting current through the control windings 54 of the inductors 32, 34 and 36, respectively, will cause a change in the time required for a pulse of electrical energy to traverse the line from the input terminals 22 and 23 to the output terminals 24 and 25, but it will also cause a change in the characteristic or surge impedance of the line. Accordingly, the capacitors 38, 40, 42 and 44 are arranged so as to be variable simultaneously with the inductive reactance of the line. Because the characteristic impedance of the line is a function of the product of the individual capacitance values and the individual inductance values, this simultaneous variation can be accomplished in such manner as to vary the delay time of the line while maintaining the characteristic impedance substantially constant.

Because the capacitors 38, 40, 42 and 44 are identical, except that capacitors 38 and 44 at the ends of the line have one-half the capacity of the others, only capacitor 40 will be described in detail. In order to provide the variable capacity without the need for mechanically moving parts, ceramic dielectric material is utilized which exhibits the characteristic of an increasing dielectric constant with increase in the electrostatic field gradient present within the material. For example, a dielectric ceramic including barium titanate and strontium titanate or the like, exhibits such a characteristic. Thus, in capacitor 40, such dielectric ceramic material 56 is positioned between two condenser plates 58 and 60, connected across the line as shown. Two bias plates 62 and 64 are positioned on opposite sides of the dielectric 56 perpendicularly to the condenser plates 58 and 60, the drawings being distorted to show the construction more clearly. A high voltage is applied between the bias plates 62 and 64 and variation in this voltage causes a corresponding variation in the capacitance between the condenser plates 58 and 60. In this diagrammatic illustration, the bias field would be parallel with the capacitive field; however, the bias plates 62 and 64 may be positioned, in actual construction, so that the electrostatic bias field in the ceramic dielectric material 56 is perpendicular or at an angle with respect to the capacitive field as will be explained below. In some instances, the same plates may serve as both the bias and capacitance plates.

As is well known in the art, the delay time of an artificial line, that is, the length of time for an electrical impulse to travel from the input terminals 22 and 23 to the output terminals 24 and 25 of a delay line, such as is schematically represented in FIGURE 3, is proportional to the square root of the product of the inductance and capacitance of the elements in the delay line when these elements are adjusted so that all of the inductances are of the same magnitude and all of the capacitances are of the same magnitude, except that the values of capacitances across the input and output circuits will be equal to one-half the values of the other capacitors, as is well known in this art.

In other words, expressed mathematically and neglecting certain losses that are not important here:

$$T = \sqrt{LC} \qquad (1)$$

where "L" represents the inductance of an inductor in the delay line and "C" the capacitance of one of the capacitors along the line.

A variation in incremental inductance of each of the inductors 32, 34 and 36 through a range of nine to one can be obtained by varying the bias field applied to the inductor. A similar range of variation can be obtained in each of the capacitances 38, 40, 42 and 44 by varying the electrostatic bias field applied thereto as explained above.

Assuming that the inductance and the capacitance of the inductors and capacitors in a delay line, such as is shown in FIGURE 3, are each changed through a range of nine to one, it is seen, from Equation 1 above, that the delay time, "T," is also changed by a ratio of nine to one. Since the characteristic impedance "Z" of such a line is:

$$Z = \sqrt{\frac{L}{C}} \qquad (2)$$

the impedance of the line will remain constant provided "L" and "C" are varied proportionately.

As shown by Equation 1, the delay time can be changed over a range of three to one by varying either the inductance or the capacitance of such a delay line over a nine to one range. However, when only one of these factors is changed, the characteristic impedance of the line is changed, as can be seen from Expression 2. For instance, if "C" be held constant and "L" be changed through a range of nine to one, the impedance of the line will change through a range of three to one. Such a variation in impedance may introduce losses and disturb the matching or coupling characteristics of the system.

These difficultis can be overcome to considerable extent by simultaneously changing the impedance in which the line is terminated so that it always matches the changing impedance of the line. Such an arrangement will be described in connection with the system shown in FIGURE 9.

It is desirable that the variable inductance and the capacitance elements be normally pre-biased to have values near the mid-point of the range of variations available, thus yielding a greater flexibility in control, since the reactance can then be varied in either direction. For instance, it is possible to bias the inductors during operation so that they normally are at the mid-point of their range of change in incremental permeability, that is, a sufficient bias field is normally applied to produce a certain incremental permeability in the inductors 32, 34, and 36 so that during operation the incremental permeability can be varied above and below this point by an additional A.C. bias or control current. Such a mid-range bias can be obtained by use of a bias current of proper magnitude in the windings 54, or by using permanently magnetized material as part of or in connection with the core structures. Such an arrangement will be discussed later.

In order to provide for proper operation of the scanning systems described hereinafter, a dual bias is applied to the inductor core as well as the capacitor dielectric.

The inductor core 32 in FIGURE 3, as stated before, carries a bias winding 54. The presence of a D.C. current in this winding 54 produces a bias magnetic field which affects the permeability throughout the core 32. Thus, the inductive reactance of winding 26 can be controlled by varying the current through the winding 54. The bias current applied for the purposes of this invention consists generally of two basic components, a D.C. component, which provides the working point on the permeability curve and an A.C. component, which provides for the instantaneous values of permeability required by the momentarily needed time delay of the particular delay line of which the inductor happens to be a part. The A.C. component, and in some cases both the D.C. and A.C. component, are varied according to the scanning program of the systems described hereinafter.

An electrostatic bias can be achieved in a capacitor element by imposing a D.C. bias voltage on the bias plates, or by including in the capacitor dielectric a permanently electrostatically polarized material or electret such as is described by Southworth in U.S. Patent No. 2,460,109.

Figure 4:
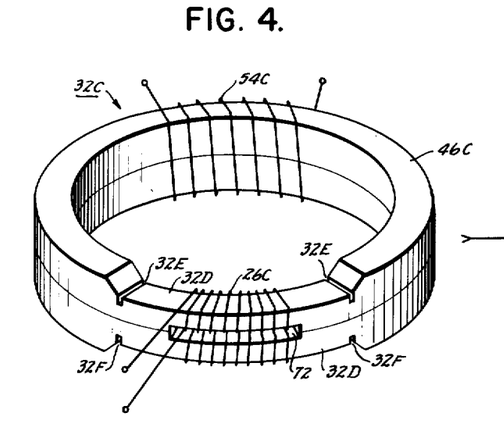
FIGURE 4 is a perspective view of a variable inductor such as may be used in the delay line of FIGURE 3.

A preferred form of variable inductor, generally indicated at 32C in FIGURE 4, has an annular core 46C composed of a ceramic ferromagnetic material, one portion of which is slotted as shown at 72. A bias winding 54C is wound around an un-slotted portion of the core 94A, and each half of the signal winding 26C is wound around one-half of the cross-section of the core 46C as shown. Such an annular core has several operating advantages, for example, compactness, high efficiency, and improved temperature response characteristics.

In order to further reduce the required control and bias power in winding 54C for changing the inductive reactance of signal winding 26C, the cross sectional area of the core 46C is reduced by notches as at 32D. These notches extend over a larger sector of the core 46C than the slot 72 separating the sections of winding 26C. This slot is made just large enough to accommodate the desired winding. The notches at 32D and on either side in small slots 32E and 32F which reduce the cross sectional area an additional amount. These slots produce a restricted cross section in the core 32C which is saturated to a higher degree than the lesser saturated area of the notches 32D and the still-lesser saturated area of the remainder of the core 32C. These pre-saturation notches 32E and 32F thus cause, in the presence of bias current in winding 54C, a cross sectional area of lower permeability than elsewhere, which restricts the flux-lines produced by the signal current in the signal winding 26C to the area of the notches 32D.

This in effect reduces the losses of energy of the signal current which are inherent to the magnetic material of the core. These losses become smaller with increased field strength in the ceramic material referred to herein and the pre-saturation slots prevent the spreading of signal current flux into the area of higher permeability and higher losses.

The grooves at 32D result also in a faster decrease of the permeability in that area than in the thicker part of the core 46C, which reduces the required power in the winding 54C for a specific change of inductance. Furthermore, the grooves result in a substantial linearization of the inductance versus bias current curve.

The FIGURE 4 actually shows two annular rings fitted together on one surface. This does not change the described performance but simplifies the production of these ceramic cores.

Figure 6:
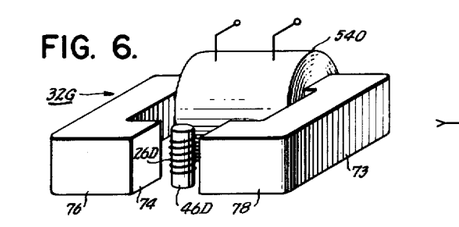
FIGURE 6 is a perspective view of another variable inductor such as may be used in a delay line of FIGURE 3.

FIGURE 6 shows diagrammatically an alternate form of an inductor, generally indicated at 32G, such as can be used in the delay line of FIGURE 3. The core 73 of this inductor is composed of any suitable magnetic material such as soft iron and is of a generally rectangular form having a gap 74 defined by opposing faces of a pair of pole pieces 76 and 78. The bias winding 54D is wound around a portion of the core 73 opposite the gap 74. When a bias current is impressed upon the terminals of the bias winding 54D a magnetic field is created throughout the body of the core 73 and this bias field passes through the gap 74. With this construction, the density of the bias field existing in the gap 74 can be regulated or controlled by varying the bias current flowing through the winding 54D. Within the gap 74 is located a core 46D, of a ferromagnetic ceramic material which has a relatively high magnetic permeability compared with air, around which is wound the inductive winding 26D. The flux existing in the gap 74 passes through the core 46D creating a bias magnetic field within the body of the core. The direction of the bias field in gap 74 extends substantially parallel and between pole pieces 76 and 78, and the direction of the bias field created in the core 46D will be in the same direction. Because the axis of winding 26D is substantially perpendicular to the direction of the magnetic bias field extending across the gap 74, so that the direction of this bias field is substantially perpendicular to the inductive field created in the core 46D by the inductive winding 26D. There is, therefore, a minimum of magnetic flux which is mutual to these two fields and, consequently, the interaction between the bias winding 54D and the inductive winding 26D is minimized.

In practice, the gap 74 is completely filled with magnetic material. For example, iron powder may be mixed with a thermosetting plastic material to form a paste which is then pressed into the gap 74. The plastic is then hardened in the usual manner. It is advantageous also to apply the magnetic field to the gap before the plastic is hardened and to maintain this field during the curing process. This orients the magnetic particles and produces a lower magnetic reluctance in the desired direction while restraining undesired eddy currents along other paths.

As explained above, changing the magnitude of the bias current in the bias winding 54D changes the density of the bias field existing in the gap 74, and accordingly changes the inductance presented by the inductive coil 26D.

Figure 5:
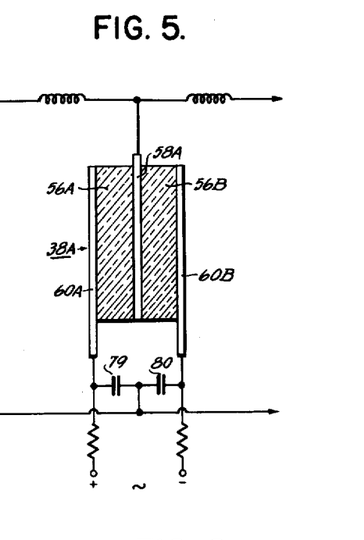
FIGURE 5 is a diagrammatic view of a condenser the capacity of which may be varied by changing the magnitude of an applied control potential and which may be used in the delay line of FIGURE 3.

A capacitor, generally indicated at 38A in FIGURE 5, is suitable for use in the variable delay lines. One conductor of the delay line is connected to a conductive plate 58A positioned between two sheets 56A and 56B of dielectric material as described in connection with FIGURE 3. The other conductor of the delay line is connected through two fixed condensers 79 and 80, respectively, to condenser plates 60A and 60B positioned adjacent the outer surfaces of dielectric sheets 56A and 56B. A D.C. bias and an alternating or D.C. control voltage is applied between plates 60A and 60B to control the capacity between the two lines of the delay line.

Figure 8:
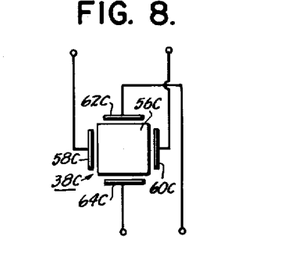
FIGURE 8 is a cross-sectional view of another electrically variable capacitor such as may be used in the delay line of FIGURE 3.

A capacitor, generally indicated at 38C in FIGURE 8, can be used in the delay line of FIGURE 3. The capacitive plates 58C and 60C are located on opposite sides of a block 56C of ceramic dielectric material of the nature discussed above. On two other opposite sides of this block are located the bias plates 62C and 64C. It is seen that the imposition of a bias voltage upon these plates 62C and 64C creates an electrostatic stress or field throughout the body of dielectric 56C, which regulates or controls the dielectric constant of the dielectric material 56C thereby controlling the capacitance existing between the capacitance plates 62C and 64C as discussed above.

Figure 7:
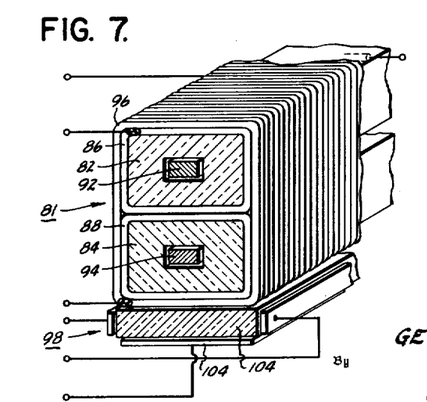
FIGURE 7 is a cross-sectional and partial perspective view of a variable delay line.

An alternate form of delay line is indicated generally at 81 in FIGURE 7. In this embodiment, the delay line is constructed with distributed constants, whereas the delay line shown in FIGURE 3 is of the type having so-called "lumped" elements, that is, having individual discrete inductors and capacitors.

Thus, in FIGURE 7 the inductors and capacitors are all included in one integrated structure. The inductor part of this delay line comprises first and second core portions 82 and 84. These portions of the core are composed of a ferromagnetic ceramic material, as discussed above in connection with the Snoek patents. In order to provide a bias magnetic field in these core portions 82 and 84, bias windings 86 and 88 are wound therearound. These windings are wound in opposite senses around the core portions 82 and 84 so that the bias fields established therein are in opposite directions. A pair of permanent bar magnets 92 and 94 may be positioned longitudinally through the centers of the cores 82 and 84 for the purpose of establishing a permanent magnetic bias for biasing the cores 82 and 84 approximately at the midpoint of their permeability ranges for the reasons explained above. The windings 86 and 88 are connected in series opposing so that the direction of the bias fields established in core portions 82 and 84 are also in opposite direction.

Wound around both of these core portions 82 and 84 and their windings 86 and 88 is an inductive winding 96. A distributed capacitor, generally indicated at 98, is positioned adjacent one side, but such capacitors may be positioned adjacent two or more sides if desired. The capacitor 98 is provided with a core or block 102 of a dielectric ceramic material such as is mentioned above, and a capacitive plate 104 is positioned opposite the winding 96. The other plate of this condenser is formed by exposed portions of the turns of the winding 96 that are adjacent the dielectric block 102. In operation an electrical impulse is introduced into the delay line between the plate 104 and one end of the winding 96 and after an interval sufficient for the impulses to traverse the line it appears between the other end of winding 96 and the plate 104.

By varying the amount of bias current flowing through the bias windings 86 and 88, the inductance of the winding 96 is changed, thus varying the delay time of the artificial line.

Two plates 106 and 108 are provided on opposite sides of the dielectric block 102 to control the capacitance of the line. A bias voltage applied between plates 106 and 108 produces a transverse electrostatic field in the dielectric material so that the capacitance of the condenser 98 can be varied by changing the bias voltage applied to plates 106 and 108. A similar effect could be obtained by applying the bias voltage between the windings of coil 96 and the plate 104, however, this arrangement has the disadvantage of inducting bias voltages into the signal circuit. Thus, either or both the inductance or capacitance can be changed to vary the delay time of this distributed delay line.

Figure 9:
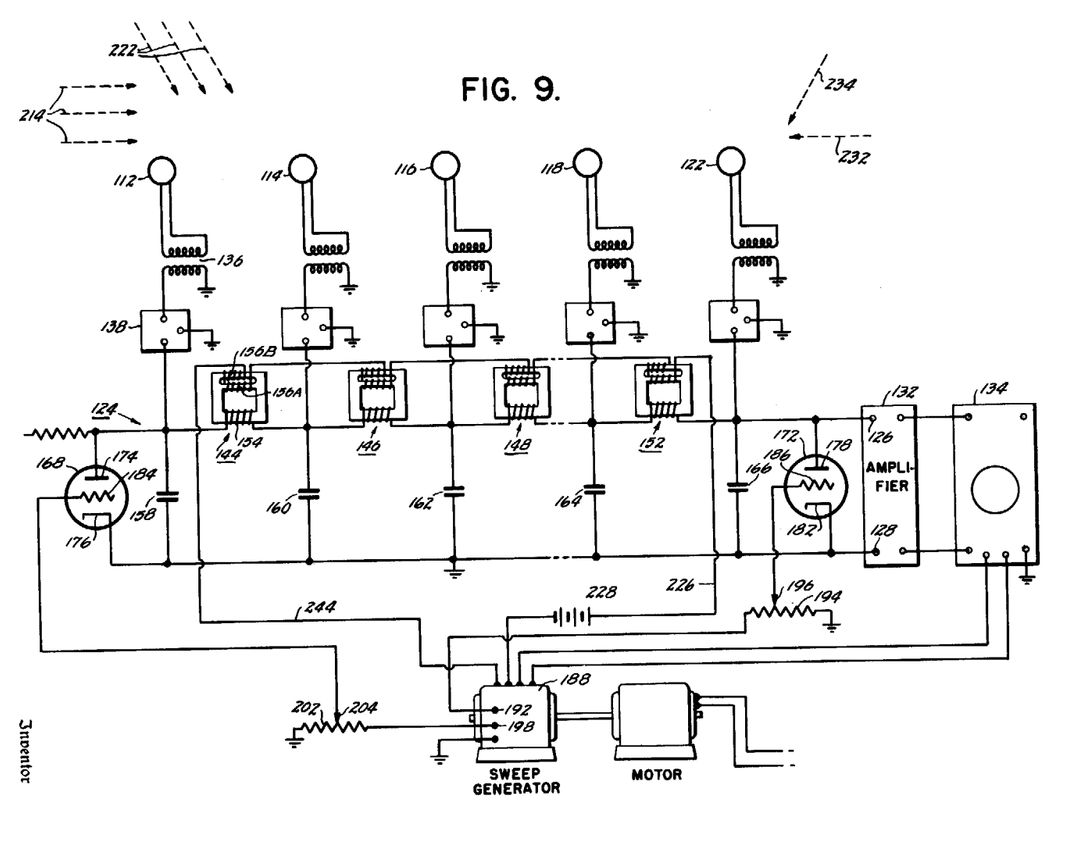
FIGURE 9 is a diagrammatic representation of a sonar system using a linear array of hydrophones or magnetostrictive transducers connected to a delay line network.

FIGURE 9 shows, diagrammatically, a receiver apparatus embodying the invention. This receiver includes five hydrophones 112, 114, 116, 118 and 122 connected through suitable circuit arrangements, to be discussed later, to a delay line, generally indicated at 124. The output terminals 126 and 128 of the delay line 124 are connected through an amplifier indicated in block form at 132, to signal indicating and measuring apparatus, indicated in block form at 134. The hydrophones 112, 114, 116, 118 and 122 pick up sonic pulses in a communicating body of water, not shown, and convert the energy in these pulses into electrical impulses which travel through the delay line 124 to the measuring device 134.

The hydrophone 112 is connected through an impedance matching transformer 136 to a pre-amplifier 138. The output from the amplifier 138 is connected between a common ground circuit and one terminal of the delay line 124.

The delay line 124 includes serially connected inductors, indicated generally at 144, 146, 148 and 152, each of which may be of the same general type as any one of the inductors described in connection with FIGURES 3, 4 and 6, for example, includes an inductance winding 154 and two oppositely wound bias or control windings 156A and 156B connected in series.

Conventional type capacitors 158, 160, 162, 164 and 166 are connected across the delay line between the respective inductance elements.

Each of the remaining hydrophones is coupled to the delay line 124 in the same manner as the hydrophone 112, the hydrophone 114 being connected to the line between inductors 144 and 146, the hydrophone 116 between inductors 146 and 148, the hydrophone 118 between inductors 148 and 152, and the hydrophone 122 to the output of the line.

Because the delay line 124 has its delay time controlled by varying the inductance of the inductors 144, 146, 148 and 152 without proportionately changing the capacitance of the line condensers, the characteristic impedance of the delay line will vary.

In order to reduce reflection losses in the line a termination is provided for delay line having an impedance which can be varied to match the varying impedance of delay line 124. This variable impedance is produced by a triode vacuum tube 168 connected between the input terminals of the delay line and a second triode vacuum tube 172 is connected between the output terminals of the line.

The anode 174 of the vacuum tube 168 is connected to one input terminal of the line and its cathode 176 is connected to the other input terminal. The anode 178 of the tube 172 is connected to one of the output terminals of the line 124 and its cathode 182 is connected to the other output terminal.

It is thus seen that the delay-line terminals look into the plate-to-cathode impedance of the triodes 168 and 172. In order to vary the plate-to-cathode impedance of these tubes so that this plate-to-cathode impedance is maintained substantially commensurate with the characteristic impedance of the delay line 124, a variable bias is impressed upon their control grids 184 and 186 in time relationship with the variable bias current fed to the bias windings of the inductors 144, 146, 148 and 152. The variable bias for the control grid 186 of tube 172 is supplied from a sweep generator 188, an output terminal 192 of which is connected to one terminal of a potentiometer 194, the opposite terminal of which is connected to the common ground circuit. The grid 186 is connected to the sliding contact 196 of the potentiometer 194. In a similar manner, the variable grid bias voltage for the grid 184 of tube 168 is provided from a terminal 198 of the sweep generator 188, this voltage being impressed between a common ground and a potentiometer 202, and is fed to the grid 184 from the potentiometer contact 204. The potentiometers 194 and 202 allow the grid bias on tubes 168 and 172 to be adjusted to obtain the desired range in plate-to-cathode impedance. The sweep generator 188 is driven by a motor 206 which is connected to power mains 208 and 212.

In order to explain the operation of the system it will be assumed that a pulse of sonic energy is traveling in the direction indicated by the arrows 214. When the pulse impinges upon the hydrophone 112, some of the energy therein is converted into an electrical impulse which is fed through the transformer 136 into the amplifier 138. The output from the amplifier 138 is introduced into the delay line at the anode 174 of the tube 168, and thence travels down the line toward the amplifier 132.

During the time interval this electrical impulse is traveling along the delay line, the sonic pulse is traveling toward the other hydrophones and impinges next upon the hydrophone 114, a portion of its energy being converted thereby into an electrical impulse. This electrical impulse is amplified and fed to the junction point of the inductors 144 and 146. If the delay characteristics of the line 124 are adjusted correctly, the electrical impulse from the hydrophone 114 will arrive at the terminal of the inductor 146 simultaneously with the impulse from the hydrophone 112. These two impulses will reinforce each other and continue along the line 124 to the junction of the inductors 146 and 148 where the line pulse is reinforced by the pulse from the hydrophone 116; the line pulses being reinforced similarly by the pulses from the hydrophones 118 and 122.

As explained, it is assumed that the delay characteristics of the line 124 are adjusted so that the electrical impulses from the hydrophones are additive along the line. Since the original sonic pulse was traveling in a direction parallel with the line along which the hydrophones are arranged, it is apparent that the sonic pulse takes the longest length of time to travel from one to another of these hydrophones. Therefore, the delay time of the line 124 is at a maximum, or in other words the inductors 144 through 152 are supplied with control current to provide maximum inductance. It is apparent also that sonic waves traveling in any direction other than that indicated by the arrows 214 will not be reinforced on the line 124 because of the time-selective action of the delay line.

When the combined electrical impulse reaches the end of the line 124, it is applied to the amplifier 132 with substantially no reflection back along the delay line 124 because the plate-to-cathode impedance of triode 174 is matched to the surge impedance of the line 124, as explained above. From the amplifier 132 the amplified impulse passes into the indicating or measuring device 134 which may include a cathode-ray oscilloscope.

In order for the indicating and measuring device 134 to indicate the direction of an underwater object, it is supplied with a time-reference or sweep control voltage by means of a lead 216 connected into the sweep generator 188, the return circuit being through the common ground circuit.

Another lead 218 may be used to provide the indicating and measuring device 134 with a pulse of voltage at the instant the transmitter (not shown) transmits the sonic pulse, so that the measuring device 134 can measure the time lag between transmission and reception of pulses and thus indicate the range of distance of an object under observation.

Thus, when the delay line is adjusted for maximum delay time, the receiver has its greatest sensitivity for sonic pulses arriving in the direction of the arrows 214. But if the delay line is adjusted for a shorter delay, for example, approximately one-third that of maximum delay, by varying the inductance of the line 124, the receiver will have maximum sensitivity for sonic pulses arriving in the direction indicated by the arrows 222, which form an angle of approximately 70° or 80° with the direction of the arrows 214, the scanning angle depending upon the change in inductance that can be produced by varying the control voltage. By varying the control current through the inductors 144, 146, 148 and 152 cyclically from maximum to minimum, the receiver is caused to scan this 70° angle.

A bias and control current varying cyclically from a minimum to a maximum is provided from the sweep generator 188 through a lead 224, the serially-connected control windings of inductors 144, 146, 148 and 152, a lead 226, and a battery 228 to the generator 188. The sweep generator 188 provides an alternating current and the battery 228, or other D.C. source, provides sufficient voltage so that the resulting current is unidirectional and continuously varying in magnitude. The D.C. source 228 alone may be of such magnitude as to provide a bias field within the inductors 144, 146, 148 and 152 corresponding to the mid-point of the desired inductance range, and the sweep generator 188 varies the bias cyclically to change the incremental inductance over the desired range.

By connecting an amplifier similar to the amplifier 132, and a measuring or detecting device similar to the device 134 across delay line terminals adjacent the tube 168, the receiver will also respond to sonic pulses arriving between the directions indicated by the arrows 232 and 234. This portion of the system, which is omitted in order to simplify the drawings, in practice can be used to obtain twice the total scanning coverage. The directions between those indicated by the directions of arrows 222 and 234, can be scanned by a second receiver with hydrophones mounted along an appropriate line, or by using another embodiment of the invention discussed hereinafter.

As the delay time is changed cyclically, the characteristic impedance of the line 124 changes correspondingly, and the termination impedance presented by the triodes 168 and 172 is caused to match continuously the impedance of the delay line 124 by means of a cyclically changing grid bias voltage fed thereto, as explained above.

Although this system has been discussed as though it were limited to receiving, it is apparent that by providing suitable switches for reversing or circumventing the amplifiers, and for connecting a pulse generator to one end of the delay line 124, the system will operate as a direction radiator or transmitter of sonic pulses. The electrical pulses will be distributed by the line 124 with appropriate time delays to the hydrophones 112, 114, 116, 118 and 122, and will be converted into sonic pulses by these hydrophones and radiated in a beam whose direction depends upon the delay time of the line 124. By varying cyclically the bias current of the inductors 144, 146, 148 and 152 by means of the sweep generator 188, the transmitted beam of sonic energy will scan back and forth over the range indicated above.

Figure 10:
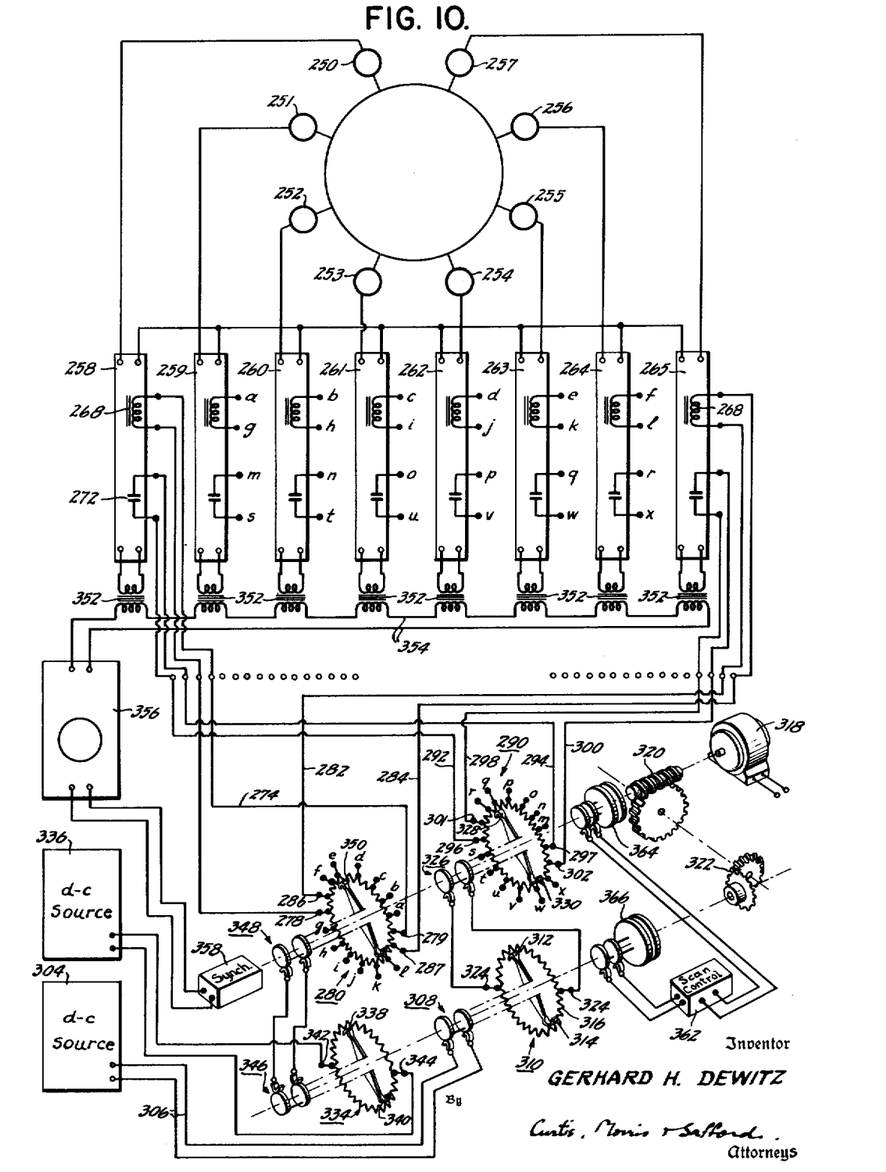
FIGURE 10 is a diagrammatic representation of a sonar system utilizing a circular array of hydrophones.

FIGURE 10 shows a receiving system using a circular array of hydrophones indicated diagrammatically at 250 through 257. Each of these hydrophones is connected to the input terminals of a separate delay line, indicated diagrammatically at 258 through 265. Each of these delay lines, shown diagrammatically to simplify the drawings, includes one or more inductance control units, indicated diagrammatically at 268, and one or more variable capacitance units, indicated diagrammatically at 272. It is understood that these inductance control units 268 comprise inductors having control and inductive windings, as previously explained, and may be either of the lumped or distributed type. The capacity control units 272 comprising lumped or distributed capacitors having bias and capacitive plates.

One of the inductance control units 268 is shown connected by leads 274 and 276 to a pair of terminals 278 and 279 on a distribution potentiometer, generally indicated at 280. Likewise another of the inductance control units 268 is indicated as connected by leads 282 and 284 to distributor terminals 286 and 287 on the potentiometer 280. In similar fashion each of the remaining inductance control units is supplied with bias current from terminals on the distributor potentiometer 280, the individual leads not being shown but the connections being indicated by corresponding letters at the inductance units and potentiometer terminals.

In similar manner, the capacitive control units 272 are connected to pairs of terminals on another distribution potentiometer, generally indicated at 290. One of the capacitive units 272 is shown connected through leads 292 and 294 to terminals 296 and 297, and another capacitive control unit is shown as connected through leads 298 and 300 to terminals 301 and 302. The remaining leads are not shown but are indicated by corresponding letters on the terminals of the capacitive units and the distribution potentiometer 290.

In the transmitter and receiver indicated in FIGURE 1 and the receiver shown in FIGURE 9, the hydrophones are arranged along a single line and the apparatus can scan only in two dimensions. However, in the receiver shown in FIGURE 10, the hydrophones are arranged in a substantially planar circular array and hence the receiver scans in three dimensions as will be explained. A symmetrical circular array is here chosen for purposes of illustration, but the hydrophones can be arranged in any desired array, symmetrical or non-symmetrical. One method of utilizing the receiver for three-dimensional scan is to scan radially in azimuth and to advance slowly in elevation from the plane of the paper to the direction perpendicular thereto. The fourth dimension, is the range of the scanning, which is determined by measuring the time lag between the transmission and reception of a sonic pulse. Such measurements are well known in the art and are not explained herein.

The circuits for supplying the scanning bias currents and voltages for delay lines 258 through 265 are as follows: First, the bias and control current for the various inductance-control units 268 is supplied from a direct current source, indicated in block form at 304, connected through leads 306 to a slip-ring assembly generally indicated at 308 of a primary distribution potentiometer, generally indicated at 310. The slip rings 308 are connected, respectively, to a pair of rotatably-mounted sliding contacts 312 and 314 which move along a circular resistance element 316. A motor 318, connected through a suitable speed-reduction worm gear assembly 320 and a bevel gear assembly 322, revolves the contacts 312 and 314 to move them along the resistance element 316 at a relatively slow rate. The current introduced into the resistance element 316 by the contacts 312 and 314 pass therethrough to a pair of fixed output terminals 324.

When the contacts 312 and 314 move past the terminals 324 substantially no resistance is interposed into the circuit between the slip rings 308 and the terminals 312 and 314 and hence the maximum current appears at these terminals, and when the contacts 312 and 314 are midway between the output terminals 324, the maximum resistance is interposed into the circuit between the slip rings 308 and the terminals 324 so that minimum voltage appears at these terminals.

The terminals 324 are connected through a second slip-ring assembly, generally indicated at 326, to a pair of rotatably-mounted sliding contacts 328 and 330 of the distribution potentiometer 290. The motor 318 is directly connected to rotate the contacts 328 and 330 at a relatively higher rate of speed than the contacts 312 and 314. Spaced at intervals along the potentiometer 290 are the diametrically oppositely disposed pairs of output terminals which are connected to the capacitive control units 272.

Another primary distribution potentiometer generally indicated at 334, functions similarly to the potentiometer 310. Thus, the current supplied from a direct-current source, indicated in block form at 336, is connected through rotating contacts 338 and 340, driven in synchronism with the contacts 312 and 314, and terminals 342 and 344 of the primary distribution potentiometer 34, and slip-ring assemblies, generally indicated at 346 and 348, to two rotatably-mounted contacts 350 and 352 of the distribution potentiometer 280.

With this arrangement, the bias current supplied to each inductive control unit varies in the following manner: First, the current cyclically varies slowly from a maximum to a minimum and back again in accordance with the rotation of the contacts of the primary potentiometer 334. Superimposed upon this slow cyclic variation is the more rapid variation caused by the rotating contacts of the potentiometer 280 from which the current is distributed to the individual inductance control units 268. The bias voltage applied to the capacitive control units, of course, varies in a similar manner.

The slow variation produces the scanning in elevation, for when the potentiometers 334 and 310 are in a position to produce maximum delay in the delay lines 258 and 265 the system is more sensitive to sonic pulses arriving in directions substantially parallel to the plane of the circular array of hydrophones. When these potentiometers 334 and 310 are in a position to produce equal delay, the system is most sensitive to sonic pulses arriving from directions more nearly perpendicular to the plane of the hydrophone array.

The distribution potentiometers 280 and 290 serve to distribute the bias current to the delay lines in such varying amounts and in such an order that the system is most sensitive to sonic pulses impinging thereon from a continually changing direction in azimuth. This latter change in sensitivity causes, effectively, a rotating scanning action, which combined with the slow change in elevation caused by the variations in current from potentiometers 334 and 310 results in a substantially complete hemispherical scanning action by the receiver.

By maintaining a proportionate relationship between the magnitudes of the capacitance and inductance in the delay lines 258 and 265, as they are being changed, the characteristic impedance of the lines is maintained constant, thus obviating the necessity for a variable impedance termination such as is shown in FIGURE 9.

In order to achieve this proportionate change in the magnitude of the capacitance and inductance, the resistive elements of the potentiometers 280 and 290 are tapered to compensate for the characteristics of the ferromagnetic ceramic and dielectric ceramic materials used in the control units 268 and 272.

It is understood that there may be included in each hydrophone circuit suitable impedance matching devices, preamplifiers and means for adjustment, for example, as are indicated in FIGURE 10, but these portions of the system are well known in the art and have been omitted to simplify the description.

The output signals from these delay lines 258 through 265 are fed, respectively, through transformers 352 into a collection line 354 and therethrough into a conventional detecting, indicating and measuring device, indicated in block form at 356.

Sweep control voltage for the device 356 is derived from a synchronization generator, indicated in block form at 358, that is operated from the motor 318 in synchronism with the rotary contacts of potentiometers 280 and 290. Such arrangements are well known in the art.

A scanning control unit is shown in block form at 362 and is arranged to operate selectively two magnetic clutches 364 and 366 which respectively control the scanning and azimuth potentiometers.

If desired a mechanical or electrical device may be coupled to the potentiometers 334 and 310 to indicate the elevational scanning angle.

FIGURE 11 shows another embodiment of the invention, in which the hydrophone array, generally indicated at 400, incorporates three concentric rings of hydrophones, the hydrophones being arranged in radial alignment. This arrangement of hydrophones increases the directional sensitivity of the apparatus over that of receiver shown in FIGURE 10. The electrical signals from these concentric rings of hydrophones are passed through delay lines to provide the relative and proportionate delay times so that the electrical signals reinforce each other, as explained below.

Each of these hydrophones is connected to a common ground circuit which provides one connection between these hydrophones and the delay lines 401 through 408. The hydrophones, indicated at 409 through 416, in the outer ring are connected, respectively, to the input end of the delay lines indicated diagrammatically at 401 to 408. The hydrophones indicated at 409A to 416A, of the intermediate ring are connected respectively to the terminals 418 of the delay lines 401 to 408. Hydrophones, indicated at 409B through 416B, of the central ring, are connected, respectively, to terminals 420 of the delay lines.

These connections to the delay lines are such that electrical pulses from the outer ring of hydrophones 409–416 are subjected to proportionately longer delays than those from hydrophones 409A–416A, in the intermediate ring, and likewise electrical signals from hydrophones 409A–416A in the intermediate ring are subjected to proportionately longer delays than those from the central ring of hydrophones 409B–416B. These proportionate delays are obtained by connecting the terminals 418 and 420 into appropriate points along the delay line. Thus, for instance, the length of the delay time between the input end of delay line 401 and terminal 418 is a fixed proportion of the total delay time of the entire line. When these lines are controlled for maximum delay time, then correspondingly, the lengths of delay between the terminals 418 and 420, respectively, and the input end of the line are correspondingly maximum.

In order to provide a controlled current for the inductance control units 422 of the delay lines, a current generator, generally indicated at 424, may be provided. The generator 424 includes separate current windings corresponding to each of the inductance control units 422. One end of each of these windings is connected to a common terminal 425, which is connected to one terminal of each inductance control units 422, and the other ends are connected to the terminals, generally indicated at 426, which are connected respectively to the other terminals of the inductance control units 420.

It is understood that the inductance units 422 are represented diagrammaticaly in this drawing and that each delay line includes a number of such units connected in accordance with the principles hereinbefore set forth.

In order to provide a controlled voltage for the capacitance control units, diagrammatically indicated at 428, a voltage generator, generally indicated at 430 is provided, the stator of which includes separate voltage windings having a common terminal 432 and separate terminals, generally indicated at 434, which are connected to capacitance control units 428. All of the capacitance control circuits are connected to the common terminal 432. The delay lines, of course, include any desired number of capacitance control units.

As the rotors of the generators 424 and 430 are driven by a motor 436, a varying delay is produced sequentially in each of the delay lines to produce a circular scanning action of the hydrophones.

In addition to the circular scanning action, elevational scanning is produced by varying the field strengths of the generators 430 and 424. A direct current source 438 supplies current through a slip-ring assembly, generally indicated at 440, to two contact arms 442 and 444 of a circular potentiometer, generally indicated at 446. The varying voltage produced at terminals 448 and 450 of the potentiometer 446 is connected through a slip-ring assembly, generally indicated at 452, to the field of the generator 424.

The elevational scanning of the capacitance control units 428 is produced in a manner similar to that in the inductance control units. That is, a direct current source 454 supplies current to a slip-ring assembly, generally indicated at 456, and thence under the control of a potentiometer, generally indicated at 458, to the field winding of the generator 430. The windings of the generator 430 are so positioned that the variations in the capacitance of the control units 428 is at all times proportionate to the variations in the inductance so that the characteristic impedances of the delay lines 401–408 remain constant.

In order to provide the proper quiescent bias for the inductance and capacitance control units, two direct current sources 460 and 462, respectively, are included in the common control leads of these units.

A scanning control mechanism, generally indicated at 464 is provided to regulate the scanning operation, including the transmission of sonic pulses to a transmitting hydrophone 466 as will be explained. In order to regulate the elevational scanning, the contact arms are driven in unison by a worm gear assembly 466 which is driven by the motor 436 through bevel gears 468 and 469, and a magnetic clutch 470. Whenever the magnetic clutch 470 is energized, the contact arms of the potentiometers 446 and 458 are advanced to change the elevation of the hemispherical scanning.

The clutch 470 is energized from power mains 472 and 474 through two contact members 476 and 478, which are closed periodically by a cam member 482 having raised cam surfaces 484 and which is driven by the motor 436 through a bevel gear 486. As the cam 482 is rotated, the raised cam surfaces 484 periodically close contact members 476 and 478 to energize the magnetic clutch 470.

The cam 482 also carries a second series of raised surfaces 488 which operate another pair of switch contacts 490 and 492. Whenever these switch contacts are closed, an electrical pulse is sent from a signal generator, indicated in block form at 494, to the transmitter hydrophone 466 which radiates a sonic pulse having a duration at least equal to the time required for the receiver to make at least one complete scan in azimuth.

After a sonic pulse is transmitted, the receiver scans in azimuth until a period of time has elapsed corresponding to the maximum range of the system. When this extended scanning at one elevation is completed, one of the cam surfaces 484 closes the contact members 476 and 478 and energizes the magnetic clutch 470 to advance the contact arms of the potentiometers 446 and 458 to a new position corresponding with a slightly different elevation, when the whole operation is repeated.

Figure 12:
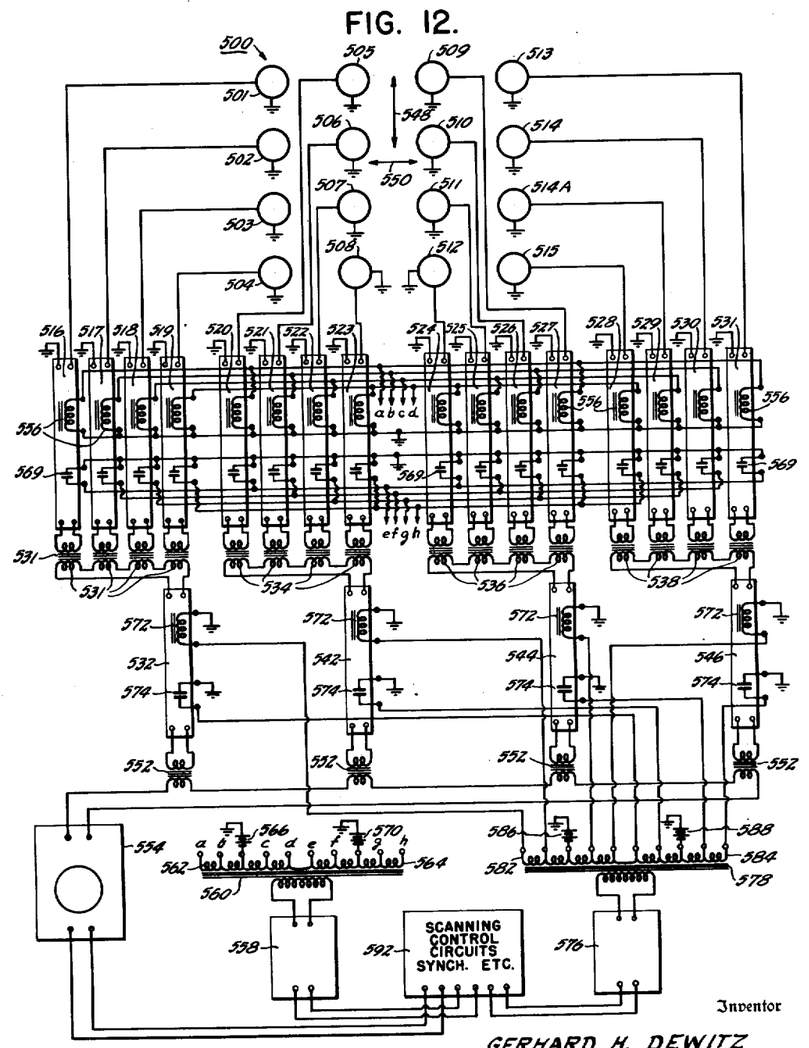
FIGURE 12 is a diagrammatic representation of another sonar system using a rectangular array of hydrophones.

FIGURE 12 shows a sonar receiver having a rectangular array of hydrophones, generally indicated at 500. Each of these hydrophones, indicated diagrammatically at 501–515, is connected individually to one of the delay lines, indicated diagrammatically at 516–531.

The output signals from delay lines 516–519 are combined by means of transformers 531, which have serially-connected secondary windings connected to another delay line 532. In a similar fashion the output signals from delay lines 520–523, 524–527, and 528–531 are combined by transformers 534, 536, and 538, respectively, and are applied to delay lines 542, 544, and 546, respectively.

Scanning in the directions indicated by arrow 548 is accomplished by varying the delay times of lines 516–531, while the delay lines 532, 542, 544, and 546 control scanning in the directions indicated by the arrow 550.

The output signals from delay lines 532, 542, 544 and 546 are combined by transformers 552, respectively, the secondary windings of which are connected in series and to a measuring and indicating device 554.

In order to provide the control current for the inductance control units, diagrammatically indicated at 556, of the delay lines 516–531, a source of alternating current 558 is connected to the primary winding of a transformer 560. This transformer is provided with a current secondary winding 562 and a voltage secondary winding 564. A center tap on the current winding 562 is connected to the common ground circuit through a battery or other source of direct current 566 for biasing the inductance control circuits to mid-range. In addition, the current secondary winding 562 has taps indicated at "a," "b," "c," and "d," respectively. The two outside taps "a" and "d" supply a control current having greater variation than has the current from taps "b" and "c," because of the winding arrangement. The taps "a" and "d" supply the inductance control units of the lines 516, 520, 527, and 531, and 519, 523, 524, and 528 which must have a greater variation in inductance in order to secure a greater variation in the delay time because the hydrophones, 501, 504, 505, 508, 509, 512, 513, and 515, connected to these delay lines, are in the extreme portions in the directions indicated by the arrow 548. These transformer taps "a," "b," "c," and "d" are connected to leads indicated by corresponding letters, the connections being omitted in order to simplify the drawings.

The control voltages for the capacitance control units 569 are provided by the secondary voltage winding 564 on transformer 560. This winding has a center tap, connected to ground through a battery or other source of D.C. voltage 570, and taps indicated at "e," "f," "g," and "h." As in the case of the current winding, the outside terminals "e" and "h" produce a greater voltage variation than is produced at the terminals "f" and "g." These terminals are connected to the capacitance control units through leads indicated by corresponding letters.

In order to produce scanning in the directions indicated by the arrow 550, the relative lengths of delay times of signals in these latter directions are controlled by delay lines 532, 542, 544 and 546.

As in the case of delay lines previously discussed, the voltage and current for the inductance and capacitance control units 572 and 574 is provided from a power source 576 connected through a transformer 578 having a current secondary winding 582 and a voltage secondary winding 584. The center tap on the current winding 582 is connected to ground through a direct current source 586 and the center tap on the voltage winding 584 is connected to ground through a D.C. voltage source 588.

The alternating current source 576 provides lower frequency voltage than the source 558 so as to produce a slow scanning in the directions indicated by the arrow 550. It is understood of course that the relative speeds of scanning along the two axes can be reversed if desired.

A control mechanism 592 is provided to regulate the scanning speeds along the two axes and also to synchronize the measuring and indicating circuits of the measuring device 554 which receives the combined outputs from the transformers 572.

Figure 13:
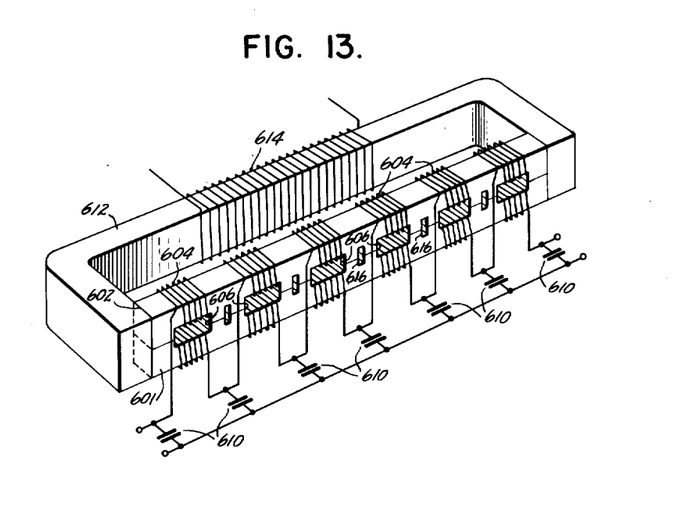
FIGURE 13 is a perspective and diagrammatic view of a delay line suitable for use in the systems described above.

Another form of a delay line with lumped elements suitable for use in the foregoing systems is shown in FIGURE 13. Here two rods 601 and 602 of ferrite material are joined along one surface to form a continuous length of core for the line. The variable inductances of the delay line are shown at 604 wound in two sections of opposing sense around the portions of the respective core rods 601 and 602 adjacent spaced slots 616. The capacitors of the delay line are shown at 610. A bias field is produced by a yoke structure 612 around which is placed an energizing winding 614. A current in winding 614 will create a bias field in the core 601—602, thus reducing the permeability of the material and therefore the inductance of all of the windings 604 thereon. No voltage is induced into the delay line by the control current, since the magnetic flux produced by the signal current in the windings 606 follows a closed loop around each slot.

In order to reduce coupling between the adjacent signal windings 606, transverse slots 616 are provided between the windings which cause presaturation by a small area between the windings.

Figure 14:
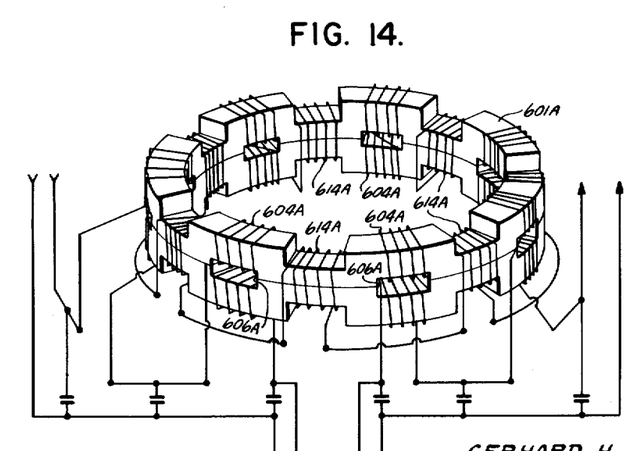
FIGURE 14 is a similar view of another form of delay line.

Still another type of delay line is shown in FIGURE 14, in which the magnetic core 601A is annular. Again slots 606A are provided for the signal windings 604A which are formed in two sections are described above. All of the signal windings 604A are connected in series except for the two end inductors of the line. All of the bias winding sections 614A are also connected in series, except for the end inductors. These bias winding sections are wound into notches provided between the slotted areas of the core. The notches function as pre-saturation areas similar to the notches or transverse slots described in connection with the previous figures. Some delay line types require a certain amount of mutual coupling between the lumped signal inductances. The structures shown in FIGURES 13 and 14 are especially useful for such delay lines.

I claim:

1. A signal combining means comprising an electrical transmission network having a plurality of inductive elements connected in series and a plurality of capacitive elements connected thereto, each of said inductive elements including a magnetizable core, a plurality of signal sources, means coupling said signal sources to electrically spaced points in said network, each of said points being separated by at least one of said inductive elements, and auxiliary means for varying the flux density of each of said cores thereby to change the reactance of said inductive elements.

2. A signal combining means comprising an electrical transmission network having a plurality of inductors connected in series and a plurality of capacitive elements connected thereto to form a time-delay line, each of said inductive elements including a core of ferromagnetic ceramic material of high magnetic permeability and low saturation flux density, whereby the reactance of said inductive elements can be varied over wide ranges by regulating the saturation of said cores, a plurality of signal sources, means coupling said signal sources to electrically spaced points along said line, fixed bias supply means arranged to establish a predetermined D.C. flux density in each of said cores to establish a predetermined reactance in each of said inductive elements, and auxiliary control means for varying the flux density of each of said cores thereby to change the reactance of said inductive elements.

3. A directive signal-reception and/or radiation system comprising a plurality of transducers, means supporting said transducers in spaced relationship, a time delay signal-transmission network including inductive means, capacitive means, and at least one core of high permeability material forming part of said inductive means, means connecting each of said transducers to electrically spaced points in said network, separate means arranged to establish flux in said core, and control means for varying the saturation of said core thereby to vary the reactance of said inductive means and control the directivity of said system.

4. A directive signal-reception and/or radiation system comprising a plurality of transducers, means supporting said transducers in spaced relationship along a linear path, a time delay signal-transmission network including inductive means, capacitive means, and at least one core of high permeability material forming part of said inductive means, means connecting each of said transducers to electrically spaced points in said network, separate means arranged to establish flux in said core, and control means for varying the saturation of said core thereby to vary the reactance of said inductive means and control the directivity of said system.

5. A directive signal-reception and/or radiation system comprising a plurality of transducers, means supporting said transducers in spaced relationship along a substantially circular path, a time delay signal-transmission network including inductive means, capacitive means, and at least one core of high permeability material forming part of said inductive means, means connecting each of said transducers to electrically spaced points in said network, separate means arranged to establish flux in said core, and control means for varying the saturation of said core thereby to vary the reactance of said inductive means and control the directivity of said system.

6. A directive signal-reception and/or radiation system comprising a plurality of transducers, means supporting said transducers in spaced relationship along radii having a common point, a time delay signal-transmission network including inductive means, capacitive means, and at least one core of high permeability material forming part of said inductive means, means connecting each of said transducers to electrically spaced points in said network, separate means arranged to establish flux in said core, and control means for varying the saturation of said core thereby to vary the reactance of said inductive means and control the directivity of said system.

7. A directive signal-reception and/or radiation system comprising a plurality of transducers, means supporting said transducers in spaced relationship, a plurality of time delay signal-transmission networks each including inductive means, capacitive means, at least one core of high permeability material forming part of said inductive means, separate means arranged to establish flux in said core, and control means for varying the saturation of said core thereby to vary the reactance of said inductive means, means coupling each of said transducers to one of said networks, and means for combining the output signals of said networks.

8. A directive signal-reception and/or radiation system comprising a plurality of transducers, means supporting said transducers in spaced relationship, a plurality of time delay signal transmission networks each including inductive means, capacitive means, at least one core of high permeability material forming part of said inductive means, separate means arranged to establish flux in said core, and control means for varying the saturation of said core thereby to vary the reactance of said inductive means, means connecting a plurality of said transducers to electrically spaced points in each of said networks, and means for combining the output signals of said networks.

9. A directive signal-reception and/or radiation system comprising a plurality of transducers, means supporting said transducers in spaced relationship, a plurality of primary and secondary time delay signal-transmission networks each including inductive means, capacitive means, at least one core of high permeability material forming part of said inductive means, separate means arranged to establish flux in said core, and means connecting each of said transducers to one of said primary networks, first circuit means combining the output signals from a first plurality of said primary network and coupling said signals to one of said secondary networks, second circuit means combining the output signals from a second plurality of said primary networks and coupling said signals to another of said secondary networks, and means combining the output signals from said secondary networks.

10. A signal combining system wherein the directional characteristics are current controllable comprising an electrical transmission network having a plurality of inductive windings connected in series and a plurality of capacitive elements connected thereto, each of said inductive windings surrounding a portion of a magnetizable core, a plurality of signal sources, means coupling said signal sources to electrically spaced points along said line, each of said points being separated by at least one of said inductive windings, and a plurality of control windings isolated from said inductive windings, each of said control windings being magnetically coupled to one of said portions of core, and a variable current source coupled to each of said control windings thereby to control the flux density of said portions of core to regulate the reactance of said inductive elements.

11. A signal combining system comprising an electrical transmission line having a plurality of inductive elements, a plurality of electrical junctions connecting said inductive elements in series and a plurality of capacitive elements, one of said capacitive elements connected to each of said junctions, each of said inductive elements including a magnetizable core, a plurality of signal sources, means coupling one of said signal sources to each of said junctions along said line, and a source of magnetic flux insulated from said transmission line and coupled with each of the cores of said inductive elements, thereby to control the flux density of each of said cores to regulate the reactance of said inductive elements.

12. A directive signal-reception and/or radiation system comprising a plurality of signal transducers in a predetermined spaced relationship, a time-delay signal-transmission network including a plurality of inductance windings connected in series, and a plurality of condensers, each of said condensers being connected in said network to points between consecutive inductance windings, a plurality of core portions of high permeability material, each of said core portions surrounded by one of said inductance windings, circuit means coupling each of said signal transducers to points in said network between inductance windings, each of said points to which said signal transducers are coupled being separated by at least one of said inductance windings, a plurality of control windings isolated from said inductance windings, one of said control windings being coupled to each of said core portions, a variable source of current connected to each of said control windings to regulate the current flowing through said control windings, thereby to vary the amount of control flux in each of said core portions, whereby the reactance of said inductance windings is varied to control the directivity of said system.

13. A signal combining system comprising an electrical transmission network having a plurality of inductance windings connected in series and a plurality of capacitive elements connected thereto, each of said inductance windings being wound on a core portion of magnetic material, a plurality of signal sources, circuit means coupling said signal sources to electrically spaced points in said network, a control winding magnetically coupled to the core portion on which each of said inductance windings is wound, a source of D.C. control current connected to supply D.C. current thereto to establish a predetermined D.C. magnetic flux density in said core portions, and a variable source of current connected thereto to vary the flux density of said core portions above and below said predetermined D.C. magnetic flux, thereby to change the reactance of said inductance windings above and below the reactance established by said steady D.C. magnetic flux.

14. A directive signal-reception and/or radiation system comprising a plurality of signal transducers, means supporting said transducers in a predetermined spaced relationship, a time-delay signal-transmission network, inductive means in said network, capacitive means in said network coupled to said inductive means, circuit means connecting each of said signal trandsucers to electrically spaced points in said network, at least a portion of said inductive means being between each of said spaced points, at least one core of high permeability material forming part of said inductive means, a variable inductance winding forming part of said inductive means, a control winding surrounding a portion of said core of high permeability material, a source of controllable current connected to said control winding to regulate the average flux density in said core, one of said windings being divided into two portions, one portion of which is connected in reverse sense relative to the other portion, whereby the magnetic coupling between said control winding and said inductance winding is substantially eliminated.

15. A directive signal-reception and/or radiation system comprising a plurality of signal transducers in a predetermined spaced relationship, a time-delay signal-transmission line having a first and second pair of terminals and including a plurality of inductance windings connected in series between one of the first pair of terminals and one of the second pair of terminals, a conductive coupling between the other terminals of each of said pairs, a plurality of condensers, each of said condensers being connected between a junction of one of said inductance windings and said conductive coupling, a core portion of high permeability material associated with each of said inductance windings, circuit means connecting each of said signal transducers to a junction of inductance windings, at least one inductance winding being between each junction to which said signal transducers are coupled, a control winding magnetically coupled to each core portion associated with each of said inductance windings, a variable source of current connected thereto, to regulate the amount of control flux in each of said core portions, whereby the reactance of said inductance windings is varied to control the directivity of said system, and a variable impedance termination connected between the two terminals of each of said pairs.

16. A system as claimed in claim 15 wherein said variable source of current is coupled to said variable impedance terminations, whereby the impedance of said terminations is varied to match the surge impedance of said line as the directivity of said system is changed.

References Cited in the file of this patent

UNITED STATES PATENTS

| | | |
|---|---|---|
| 1,636,510 | Hayes | July 19, 1927 |
| 1,901,342 | Lamson | Mar. 14, 1933 |
| 1,969,005 | Hecht | Aug. 7, 1934 |
| 1,995,708 | Fischer | Mar. 26, 1935 |
| 2,024,234 | Kunze | Dec. 17, 1935 |
| 2,302,893 | Roberts | Nov. 24, 1942 |
| 2,374,059 | Wentz | Apr. 17, 1945 |
| 2,378,555 | Jasse | June 19, 1945 |
| 2,406,340 | Batchelder | Aug. 27, 1946 |
| 2,408,395 | Hays | Oct. 1, 1946 |
| 2,413,609 | Wheeler | Dec. 31, 1946 |
| 2,445,783 | Labin | July 27, 1948 |